United States Patent
Krueger

(10) Patent No.: US 10,871,368 B2
(45) Date of Patent: Dec. 22, 2020

(54) METHOD AND DEVICE FOR WHEEL ALIGNMENT MEASUREMENT

(71) Applicant: Beissbarth GmbH, Munich (DE)

(72) Inventor: Christof Krueger, Karlsfeld (DE)

(73) Assignee: BEISSBARTH GMBH, Munich (DE)

(*) Notice: Subject to any disclaimer, the term of this patent is extended or adjusted under 35 U.S.C. 154(b) by 0 days.

(21) Appl. No.: 16/606,582

(22) PCT Filed: Apr. 3, 2018

(86) PCT No.: PCT/EP2018/058439
§ 371 (c)(1),
(2) Date: Oct. 18, 2019

(87) PCT Pub. No.: WO2018/192769
PCT Pub. Date: Oct. 25, 2018

(65) Prior Publication Data
US 2020/0141723 A1    May 7, 2020

(30) Foreign Application Priority Data

Apr. 20, 2017   (DE) .......................... 10 2017 206 625

(51) Int. Cl.
*G01B 11/27*   (2006.01)
*G01B 11/275*   (2006.01)

(52) U.S. Cl.
CPC .... *G01B 11/2755* (2013.01); *G01B 2210/143* (2013.01); *G01B 2210/20* (2013.01); *G01B 2210/26* (2013.01)

(58) Field of Classification Search
CPC .......... G01B 11/2755; G01B 2210/143; G01B 2210/20; G01B 2210/26; G01M 17/013

(Continued)

(56) References Cited

U.S. PATENT DOCUMENTS

RE33,144 E  *  1/1990  Hunter ............... G01B 11/2755
                                                    33/203.18
5,748,301 A  *  5/1998  Muller ............... G01B 11/2755
                                                    33/286

(Continued)

FOREIGN PATENT DOCUMENTS

DE     19757760 A1   7/1999
DE     19934864 A1   2/2001

(Continued)

OTHER PUBLICATIONS

International Search Report for PCT/EP2018/058439, dated Jun. 13, 2018.

*Primary Examiner* — Roy M Punnoose
(74) *Attorney, Agent, or Firm* — Norton Rose Fulbright US LLP; Gerard Messina; Dervis Magistre

(57) ABSTRACT

A device for wheel alignment measurement comprises at least two sensors which are configured to record each time at least two images of the front wheels and the rear wheels of a vehicle passing by; and an evaluation device which is configured to evaluate the images recorded by the sensors in order to determine whether the vehicle has traveled along a straight line. The sensors are arranged such that a vehicle to be measured can pass between the at least two sensors. The evaluation device is configured to determine the geometric travel axis of the vehicle and/or the individual tracks of the wheels on the front axle and/or the rear axle of the vehicle when the evaluation of the images recorded by the sensors reveals that the vehicle has traveled along a straight line.

14 Claims, 2 Drawing Sheets

(58) Field of Classification Search
USPC .................................................. 356/138, 155
See application file for complete search history.

(56) References Cited

U.S. PATENT DOCUMENTS

| | | | | |
|---|---|---|---|---|
| 2011/0100107 | A1* | 5/2011 | Nobis | G01B 11/2755 73/117.03 |
| 2014/0253908 | A1* | 9/2014 | Lee | G01B 11/2755 356/139.09 |
| 2015/0059458 | A1* | 3/2015 | Lee | G01M 17/013 73/115.07 |
| 2020/0088515 | A1* | 3/2020 | Rogers | B60R 1/00 |

FOREIGN PATENT DOCUMENTS

| | | | |
|---|---|---|---|
| DE | 102005017624 | A1 | 10/2006 |
| IE | 102005063083 | A1 | 7/2007 |
| WO | 2007059935 | A1 | 5/2007 |

* cited by examiner

METHOD AND DEVICE FOR WHEEL ALIGNMENT MEASUREMENT

FIELD OF THE INVENTION

The invention relates to a method and a device for wheel alignment measurement; in particular, to a method and a device for chassis or wheel alignment measurement of a vehicle passing by the device.

BACKGROUND INFORMATION

In the currently customary devices and methods for wheel alignment measurement, the position of all wheels of a vehicle will generally be determined at the same time. To this end, e.g. several cameras observe measuring plates ("targets") or the like, which are attached to the wheels of the vehicle. In alternative methods, the position of all wheels is determined directly from camera images in non-contacting manner.

It is thus possible to directly determine various chassis parameters, such as e.g. total track/individual track/camber/travel axle angle and various offsets, such as lateral offset, wheel offset etc.

As regards measuring principles that simultaneously observe only one wheel, there are the following possibilities for determining the entire vehicle geometry:
  use of four recording devices or sensors, each observing one wheel at a time, and formation of an overall system by using a reference system in addition;
  use of two sensors that measure both axles on a stationary vehicle one after the other. In this case, referencing between the left and the right side of the vehicle is required only because the reference from the front to the rear is given by the known translation of the measuring devices on rails that run parallel to the longitudinal direction of the vehicle.

It is an object of the invention to provide an improved method and an improved device for wheel alignment measurement, which make it possible to perform the wheel alignment measurement on a passing by vehicle with as few sensors as possible and in the smallest possible space.

SUMMARY

According to an embodiment of the invention, a method for wheel alignment measurement using two sensors comprises passing by, with a vehicle to be measured, between the two sensors, each of the two sensors recording at least two images of a wheel mounted on the front axle (front wheel) and at least two images of a wheel mounted on the rear axle (rear wheel), respectively; evaluating the images recorded by the sensors in order to determine whether the vehicle has passed between the two sensors along a straight line, and if the evaluation of the images recorded by the sensors has revealed that the vehicle has traveled along a straight line, evaluating the images recorded by the sensors in order to determine the geometric travel axis of the vehicle and/or the individual tracks of the wheels on the front axle of the vehicle.

According to an embodiment of the invention, a device for wheel alignment measurement comprises at least two sensors which are arranged such that a vehicle to be measured can pass between the at least two sensors, each of the sensors being configured to at least two images of a wheel mounted on the front axle and at least two images of a wheel mounted on the rear axle of a passing by vehicle, respectively; as well as an evaluation device which is configured to evaluate the images recorded by the sensors in order to determine whether the vehicle has traveled straight ahead or along a straight line. The evaluation device is further configured to determine the geometric travel axis of the vehicle and/or the individual tracks of the wheels on the front axle of the vehicle when the evaluation of the images recorded by the sensors has revealed that the vehicle has traveled straight ahead (along a straight line) between the two sensors.

A method and a device according to embodiments of the invention make it possible to perform the wheel alignment measurement quickly and conveniently "in passing by" the sensors.

When the vehicle is traveling straight ahead during the measurement, its geometric travel axis corresponds to the direction of travel observed. The individual tracks of the wheels on the front axle present themselves as an angle between the geometric travel axis and the wheel position observed about an axis perpendicular to the road surface.

In one embodiment, determining whether the vehicle has traveled straight ahead comprises determining the track direction of a wheel with respect to the sensor at multiple times in order to determine whether the wheel, during passing by, has rotated about a vertical axis perpendicular to the floor of the measurement site or station.

In one embodiment, determining whether the vehicle has traveled straight ahead comprises determining the respective distance (rolling distance) traveled by the wheels on the left and right sides of the vehicle, and comparing the rolling distance of a wheel mounted on the left side of the vehicle to the rolling distance of a wheel mounted on the right side of the vehicle. When the vehicle has traveled straight ahead, the rolling distances of the left and right wheels are identical within a predetermined tolerance. When cornering, the rolling distance of the curve outside wheel is greater than the rolling distance of the curve inside wheel.

In this way, it can be determined with high reliability whether the vehicle has traveled along a straight line.

In an embodiment, in a case in which the evaluation of the images recorded by the sensors has revealed that the vehicle has not traveled along a straight line, the method comprises determining a (curved) trajectory of the vehicle and compensating the trajectory using a mathematical model of the vehicle in order to obtain a compensated trajectory which corresponds to traveling of the vehicle along a straight line. From the compensated trajectory, the geometric travel axis of the vehicle and/or the individual tracks of the wheels on the front axle of the vehicle can be determined as in traveling along a straight line.

When the vehicle is steered (cornering), all wheels of the vehicle travel on circular paths about a common center. This common center can be estimated from at least one arc section observed. When the first observation of the front axle is taken as a reference, all subsequent measurements can be "turned back" geometrically about the estimated center by the observed travel distance to a common reference time. The thus compensated observations are then superimposed and no longer have distortions of the angles due to the steering movement.

When there is only one sensor present on each side of the vehicle, the wheels on the front and rear axles cannot be observed simultaneously. After the last observation (image recording) of the wheel mounted on the front axle, there is a certain time passing until the first observation (image recording) of the wheel mounted on the rear axle is made. The distance traveled in between can be estimated e.g. by interpolation of the traveling speeds observed between the front and rear axles. Thus, the observations of the wheels on the rear axle can be "turned back" by the correct angle.

By compensating the trajectory, i.e. by "deducting or eliminating" the curvature from the trajectory, the geometric travel axis of the vehicle; and/or the individual tracks of the wheels mounted on the front axle of the vehicle can also be determined if the vehicle has not traveled past the sensors along a straight line. Measuring errors that would result from a non-rectilinear trajectory can thus be avoided, without it being necessary to repeat the travel past the sensors along a straight line.

In one embodiment, the method additionally comprises calculating the axis of symmetry, i.e. the connecting line of the centers of the front and rear axles of the vehicle. This is possible if the wheelbase, i.e. the distance between the front axle and the rear axle, of the vehicle is known.

The axis of symmetry can be determined from 3D observations of the wheel centers, as long as the wheelbase is known, as it is thus possible to establish a relationship between the measurements of the front axle and rear axle. When traveling straight ahead, it can be assumed that there has been no rotation of the vehicle about a vertical axis between the passage of the front axle and the passage of the rear axle.

When the axis of symmetry is known, the travel axle angle, i.e. the angle between the geometric travel axis and the axis of symmetry of the vehicle can be determined as well.

When the axis of symmetry is known, the individual tracks of the wheels on the rear axle can be determined from 3D observations of the wheels on the rear axle.

In one embodiment, the wheelbase of the vehicle is entered manually.

In one embodiment, the wheelbase of the vehicle is determined by extrapolating the coordinates and/or by interpolating the speeds of the front and rear axle wheels of the vehicle.

In one embodiment, the wheelbase of the vehicle is determined by observing the front and rear wheels of the vehicle and determining the optical flow on the vehicle body in order to be able to seamlessly determine the distance traveled between front and rear axles.

This can be supported by in-depth information from 3D points or by SfM (Structure from Motion) algorithms. For this purpose, it is possible to use cameras which are installed in the sensors, or camera systems which are installed in a test lane, e.g. a camera for inspection of the underbody or cameras of a tire tread depth gauge.

A device according to the invention also permits the realization of a "quick-acceptance function", which comprises the following steps:
positioning the vehicle in front of a quick-acceptance station having two sensors;
adjusting the steering wheel to a central position;
passing between the sensors without changing the steering angle of the steering wheel;
issuing a warning if it is determined that the vehicle is not traveling straight ahead.

DETAILED DESCRIPTION

Figure 1:
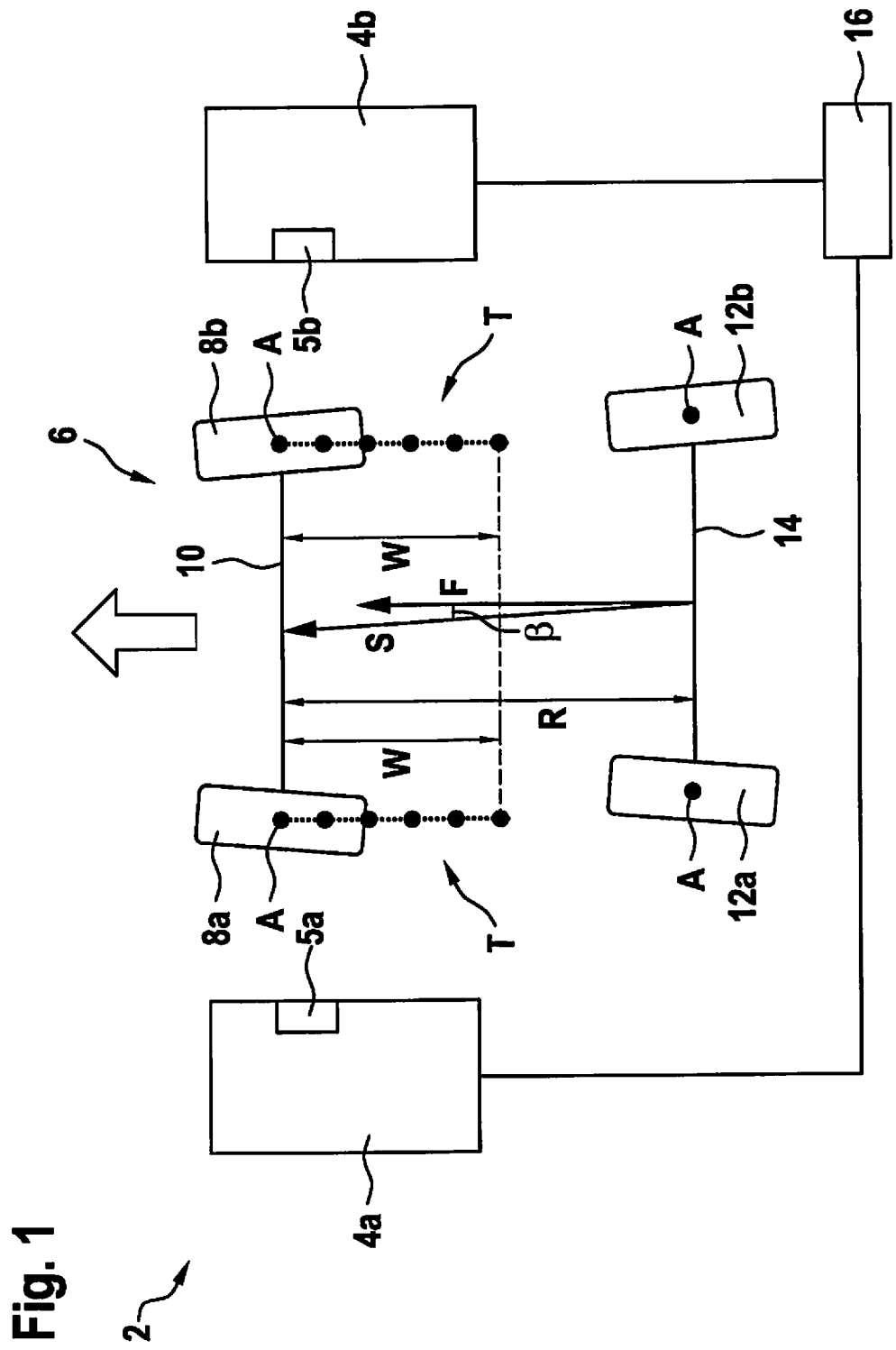
FIG. 1 shows a schematic view of a measuring site for wheel alignment measurement along with a vehicle traveling across the measuring site along a straight line.

FIG. 1 is a schematic view of a measuring station or site 2 for wheel alignment measurement, illustrating a vehicle 6 traveling across the measuring site 2 along a straight line, and two recording devices or sensors 4a, 4b.

The schematic representation of FIG. 1 shows only the front axle 10, the rear axle 14, the front wheels 8a, 8b and the rear wheels 12a, 12b of the vehicle 6.

The sensors 4a, 4b are arranged such that the vehicle 6 can pass between them. On the side facing the vehicle 6, each of the sensors 4a, 4b comprises an optical image recording device 5a, 5b, which may be formed in particular as a mono or stereo camera 5a, 5b and which is configured to capture images of the vehicle 6 passing by the sensors 4a, 4b, in particular of the wheels 8a, 8b, 12a, 12b of the vehicle 6.

The sensors 4a, 4b are connected to an evaluation device 16 in wireless or wired manner, which is configured to evaluate the signals provided by the sensors 4a, 4b, in particular image data, as described below.

For performing a wheel alignment measurement according to an embodiment of the invention, the vehicle 6 is caused to pass between the two sensors 4a, 4b. In the exemplary embodiment shown in FIG. 1, the vehicle 6 travels in particular along a straight line between the two sensors 4a, 4b.

The image recording devices 5a, 5b arranged in the sensors 4a, 4b capture images of the vehicle 6, in particular the wheels 8a, 8b, 12a, 12b of the vehicle 6, and evaluate the images in the evaluation device 16.

In the course of the evaluation, it is first determined whether the vehicle 6 has passed between the two sensors 4a, 4b along a straight line.

For this purpose, it can be determined, for example, whether the wheels 8a, 8b, 12a, 12b have rotated during the passage of the vehicle 6 about a vertical axis A which is oriented perpendicular to the floor of the measuring site 2.

As an alternative or in addition, the distance (rolling distance W) traveled by the wheels 8a, 8b, 12a, 12b on the left and right sides of the vehicle 6 can be determined, and the rolling distance W of a wheel 8a, 12a mounted on the left side of the vehicle 6 can be compared with the rolling distance W of a wheel 8b, 12b mounted on the right side of the vehicle 6. When the vehicle travels along a straight line, the rolling distances W of the left wheel 8a, 12a and the right wheel 8b, 12b are identical within a predetermined tolerance. When cornering along a curved line, the rolling distance W of the curve outside wheel 8a, 8b, 12a, 12b is greater than the rolling distance W of the curve inside wheel 8a, 8b, 12a, 12b.

If the evaluation of the images recorded by the sensors 4a, 4b reveals that, during the recording operations, the vehicle 6 has traveled straight ahead, i.e. along a straight line, the images recorded by the sensors 4a, 4b are evaluated in order to determine the geometric travel axis F of the vehicle 6 and/or the individual tracks of the wheels 8a, 8b mounted on the front axle 10 of the vehicle 6.

In the case the vehicle has traveled straight ahead, the geometric travel axis F results directly from the angle bisecting the tracks of the wheels 12a, 12b on the rear axle 14. The individual tracks of the wheels 8a, 8b on the front axle are obtained by referencing the 3D normals of the wheels 8a, 8b on the front axle 10 to the geometric travel axis F.

If the wheelbase R, i.e. the distance R between the front axle 10 and the rear axle 14, of the vehicle 6 is known, the axis of symmetry S, i.e. the connecting line of the centers of the front axle 10 and the rear axle 12, of the vehicle 6 can be calculated in addition.

The axis of symmetry S can be determined in particular from 3D observations of the wheels centers, provided that the wheelbase R is known, as it is thus possible to establish a relationship between the measurements of the front axle 10 and the rear axle 14. When the vehicle travels straight ahead, it can be assumed that no rotation of the vehicle 6 about an axis A oriented perpendicular to the floor of the measuring site has taken place between the passage of the wheels 8a, 8b on the front axle 10 and the passage of the wheels 12a, 12b on the rear axle 14.

When the axis of symmetry S is known, the travel axle angle β, i.e. the angle β between the geometric travel axis F and the axis of symmetry S of the vehicle 6 can be determined as well.

Figure 2:
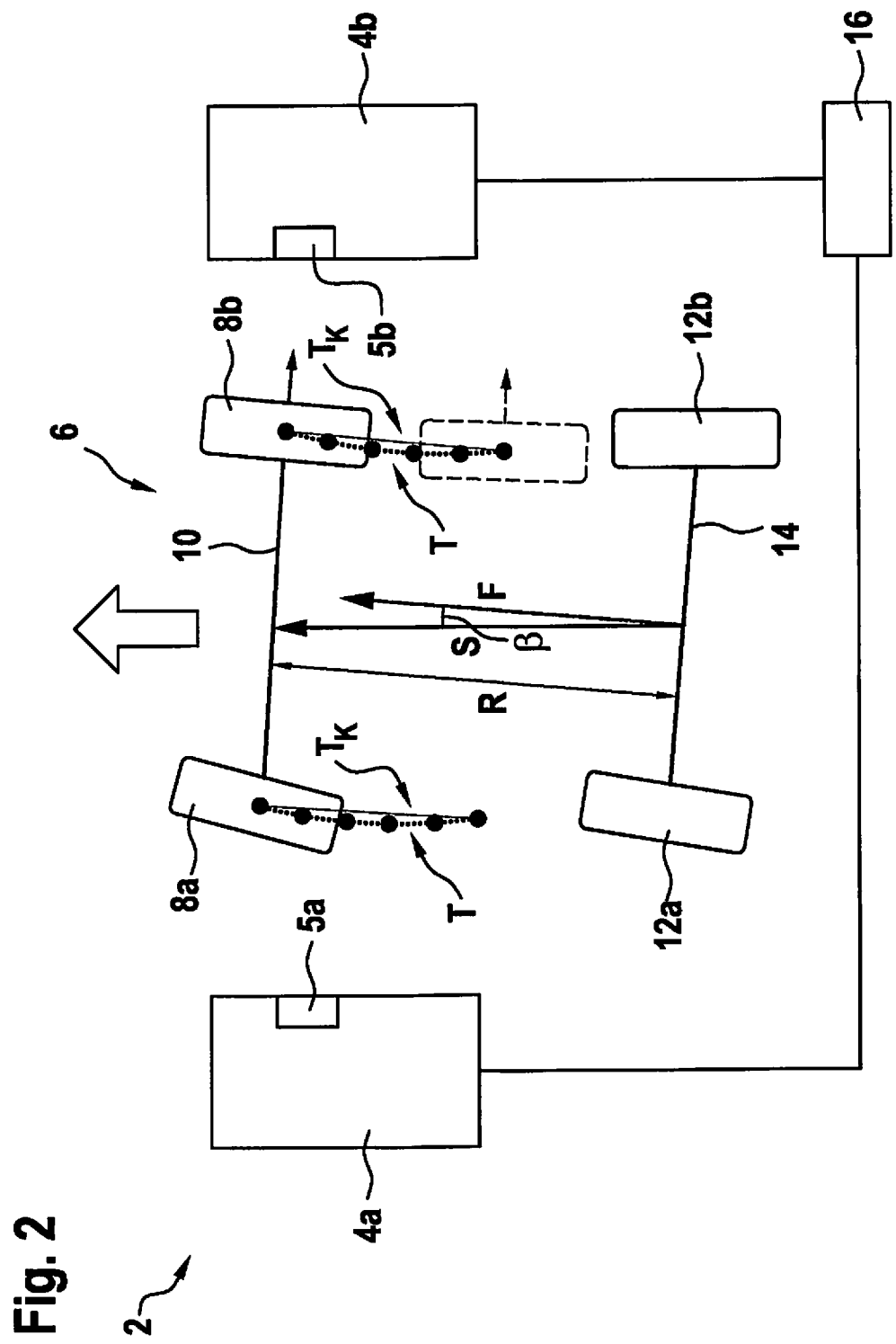
FIG. 2 shows a schematic view of a measuring site for wheel alignment measurement along with a vehicle traveling across the measuring site along a curved line.

FIG. 2 is a schematic view of the measuring site 2 for wheel alignment measurement, illustrating a vehicle 6 and two sensors 4a, 4b, in which the vehicle 6, due to a steering angle of the wheels 8a, 8b on the front axle 10, does not move across the measuring site 2 along a straight line, but along a curved path (trajectory).

In this case, the geometric travel axis F of the vehicle 6 and the individual tracks of the wheels 8a, 8b on the front axle 10 of the vehicle 6 cannot be determined directly from the curved trajectory T of the vehicle 6.

If the evaluation of the images recorded by the sensors 4a, 4b has shown that the vehicle 6 has not traveled across the measuring site 2 along a straight line, but rather along a curved trajectory T, the curved trajectory T is compensated using a mathematical model of the vehicle 6, i.e converted into a compensated trajectory Tx, which corresponds to the vehicle traveling straight ahead.

In case of a steered vehicle 6 (cornering), all wheels 8a, 8b, 12a, 12b travel along circular paths about a common center. From at least one arc section observed, the common center can be estimated. If the first observation of the front axle 19 is taken as a reference, all subsequent measurements can be geometrically "turned back" about the estimated center by the observed travel distance to a common reference time. The thus compensated observations are then superimposed and no longer have distortions of the angles due to the steering movement.

Since only one sensor 4a, 4b is present on each side of the vehicle 6, the wheels 8a, 8b on the front axle 10 cannot be observed simultaneously with the wheels 12a, 12b on the rear axle 14. After the last observation (image recording) of a wheel 8a, 8b mounted on the front axle 10, a certain time passes until the first observation (image recording) of a wheel 12a, 12b mounted on the rear axle 14 takes place. The distance traveled between the two observations (image recordings) can be estimated e.g. by interpolation of the speeds observed between the front axle 10 and the rear axle 14. Thus, the images of the wheels 12a, 12b on the rear axle 14 can be "turned back" by the correct angle.

From the trajectory Tκ compensated in this way, the geometric travel axis F of the vehicle 6; and/or the individual tracks of the wheels 8a, 8b on the front axle 10 of the vehicle 6 can be determined, as described hereinbefore in connection with FIG. 1 for traveling along a straight line.

Also when the vehicle 6 does not travel straight ahead along a straight line, the wheelbase R of the vehicle 6 may be determined by extrapolating the coordinates of the wheels 8a, 8b, 12a, 12b of the vehicle 6 or by observing the wheels 8a, 8b, 12a, 12b of the vehicle 6 and determining the optical flow in order to calculate the axis of symmetry S of the vehicle 6 with the aid of the wheelbase R determined in this manner.

As a result, the invention provides an improved method and an improved device for wheel alignment measurement that permit the wheel alignment measurement to be performed on a passing by vehicle 6. A method and a device according to embodiments of the invention in particular permit to perform the wheel alignment measurement also in case the vehicle 6 passes by the sensors 4a, 4b along a curved path.

The invention claimed is:

1. A method for wheel alignment measurement with two sensors, the method comprising:
    passing by, with a vehicle to be measured, between the two sensors, each of the sensors recording each time at least two images of a wheel mounted on a front axle of the vehicle and at least two images of a wheel mounted on a rear axle of the vehicle, respectively;
    evaluating the images recorded by the sensors to determine whether the vehicle has traveled along a straight line; and
    if the evaluation of the images recorded by the sensors reveals that the vehicle has traveled along the straight line, evaluating the images recorded by the sensors and determining a geometric travel axis of the vehicle from the images.

2. The method according to claim 1, further comprising determining individual tracks of the wheel on the front axle of the vehicle.

3. The method according to claim 2, wherein the step of determining whether the vehicle has traveled along the straight line includes determining a track direction of a wheel with respect to the respective sensor at a plurality of times.

4. The method according to claim 3, wherein the step of determining whether the vehicle has traveled along the straight line includes comparing a rolling distance of a wheel mounted on a left side of the vehicle with a rolling distance of a wheel mounted on a right side of the vehicle.

5. The method according to claim 1, if the step of evaluating the images recorded by the sensors reveals that the vehicle has not traveled along the straight line, the method further comprises:
    determining a trajectory of the vehicle;
    compensating the trajectory using a mathematical model of the vehicle in order to obtain a compensated trajectory corresponding to a traveling of the vehicle along the straight line; and
    determining from the compensated trajectory the geometric travel axis of the vehicle.

6. The method according to claim 5 further comprising determining from the compensated trajectory individual tracks of wheels on the front axle of the vehicle.

7. The method according to claim 1, further comprising:
    determining an axis of symmetry of the vehicle; and
    using the axis of symmetry thus determined, calculating at least one of individual tracks of wheels on the rear axle of the vehicle and an angle between the axis of symmetry and the geometric travel axis of the vehicle.

8. The method according to claim 1, further comprising determining a wheelbase of the vehicle by extrapolating coordinates of wheels of the vehicle.

9. The method according to claim 1, further comprising determining a wheelbase of the vehicle by observing wheels on the front and rear axles of the vehicle and determining an optical flow.

10. A device for wheel alignment measurement, comprising
at least two sensors arranged such that a vehicle to be measured can pass between the at least two sensors, each of the sensors being configured to record at least two images of a wheel mounted on a front axle and at least two images of a wheel mounted on a rear axle of a passing by vehicle, respectively; and
an evaluation device configured to:
evaluate the at least two images of the wheel mounted on the front axle and the at least two images of the wheel mounted on the rear axle of the passing by vehicle recorded by the sensors in order to determine whether the vehicle has traveled along a straight line, and
if the evaluation of the images recorded by the sensors reveals that the vehicle has traveled along the straight line, determine a geometric travel axis of the vehicle.

11. The device according to claim 10, wherein the evaluation device determines individual tracks of wheels on the front axle of the vehicle.

12. The device according to claim 10, wherein the evaluation device, in a case in which an evaluation of the images recorded by the sensors reveals that the vehicle has not traveled along the straight line:
determines a trajectory of the vehicle, and compensates the trajectory using a mathematical model of the vehicle in order to obtain a compensated trajectory corresponding to a traveling of the vehicle along the straight line, and
determines from the compensated trajectory a geometric travel axis of the vehicle.

13. The device according to claim 12, wherein the evaluation device determines from the compensated trajectory individual tracks of wheels on the front axle of the vehicle.

14. The device according to claim 12, wherein the evaluation device:
determines a wheelbase of the vehicle one of by extrapolating coordinates of the wheels of the vehicle and by observing the wheels of the vehicle and determining an optical flow, and
calculates an axis of symmetry of the vehicle with the aid of the wheelbase.

* * * * *